US008731328B2

(12) United States Patent
Hamada

(10) Patent No.: US 8,731,328 B2
(45) Date of Patent: May 20, 2014

(54) IMAGE PROCESSING APPARATUS, METHOD AND RECORDING MEDIUM FOR GENERATING A COMPOSITE IMAGE

(75) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 37 days.

(21) Appl. No.: 13/224,087

(22) Filed: Sep. 1, 2011

(65) Prior Publication Data

US 2012/0057805 A1 Mar. 8, 2012

(30) Foreign Application Priority Data

Sep. 3, 2010 (JP) ................................. 2010-197654

(51) Int. Cl.
*G06K 9/36* (2006.01)
*G06K 9/46* (2006.01)
*G06K 9/66* (2006.01)
*H04N 5/262* (2006.01)

(52) U.S. Cl.
USPC ............ 382/284; 382/190; 382/276; 348/239

(58) Field of Classification Search
CPC ................................................ G06K 9/00261
USPC ......... 382/276, 118, 162, 170, 190, 203, 218, 382/75, 283, 284; 348/222.1, 239; 358/471, 358/474, 519
See application file for complete search history.

(56) References Cited

U.S. PATENT DOCUMENTS

| 8,249,382 | B2 * | 8/2012 | Teshima et al. ................ 382/276 |
| 8,331,690 | B2 * | 12/2012 | Oh et al. ........................ 382/199 |
| 2002/0150304 | A1 * | 10/2002 | Ockman ......................... 382/260 |
| 2005/0128196 | A1 * | 6/2005 | Popescu et al. ................ 345/420 |
| 2009/0074292 | A1 * | 3/2009 | Rother et al. .................. 382/180 |
| 2010/0239174 | A1 * | 9/2010 | Oh et al. ........................ 382/199 |

FOREIGN PATENT DOCUMENTS

| JP | 11-225344 A | | 8/1999 |
| WO | WO2004049257 | * | 6/2004 |
| WO | WO 2004049257 | * | 6/2004 |

OTHER PUBLICATIONS

Boykov et al, Fast Approximate Energy Minimization via Graph Cuts, IEEE Transactions on Pattern Analysis and Machine Intelligence, vol. 23, No. 11, Nov. 2001.*
Hirayu, et al, Integration of mult,i-view panoramic range data using global features, IAPR Workshop on Machine Vision Applications, Dec. 1 1 1 3, 2002, Nara-ken New Public Hall, Nara.*
Xiong, Eliminating Ghosting Artifacts for Panoramic Images, 2009 11th IEEE International Symposium on Multimedia.*
Xiong, Eliminating Ghosting Artifacts for Panoramic Images, 2009 1 lth I EEE International Symposium on Multimedia.*
Agarwala et al.: "Interactive Digital Photomontage": ACM SIGGRAPH 2004.
Japanese Office Action dated Nov. 19, 2013 (and English translation thereof) in counterpart Japanese Application No. 2010-197654.

* cited by examiner

*Primary Examiner* — Andrae S Allison
(74) *Attorney, Agent, or Firm* — Holtz, Holtz, Goodman & Chick, PC

(57) ABSTRACT

In an image pickup apparatus 1, reference image data is generated from plural pieces of image data and further, at least two pieces of arbitrary image data are selected from among the plural pieces of image data. A first difference calculating unit 71 calculates differences between the selected pieces of image data for two adjacent pixels. A second difference calculating unit 72 calculates differences in pixel values of the selected pieces of image data from the reference image data. A cost function is set, having variables of the differences calculated by the first difference calculating unit and the differences calculated by the second difference calculating unit. A boundary setting unit 74 sets boundaries respectively in the selected pieces of image data so as to minimize the cost function. The selected pieces of image data are combined together in accordance with the boundaries set by the boundary setting unit.

11 Claims, 4 Drawing Sheets

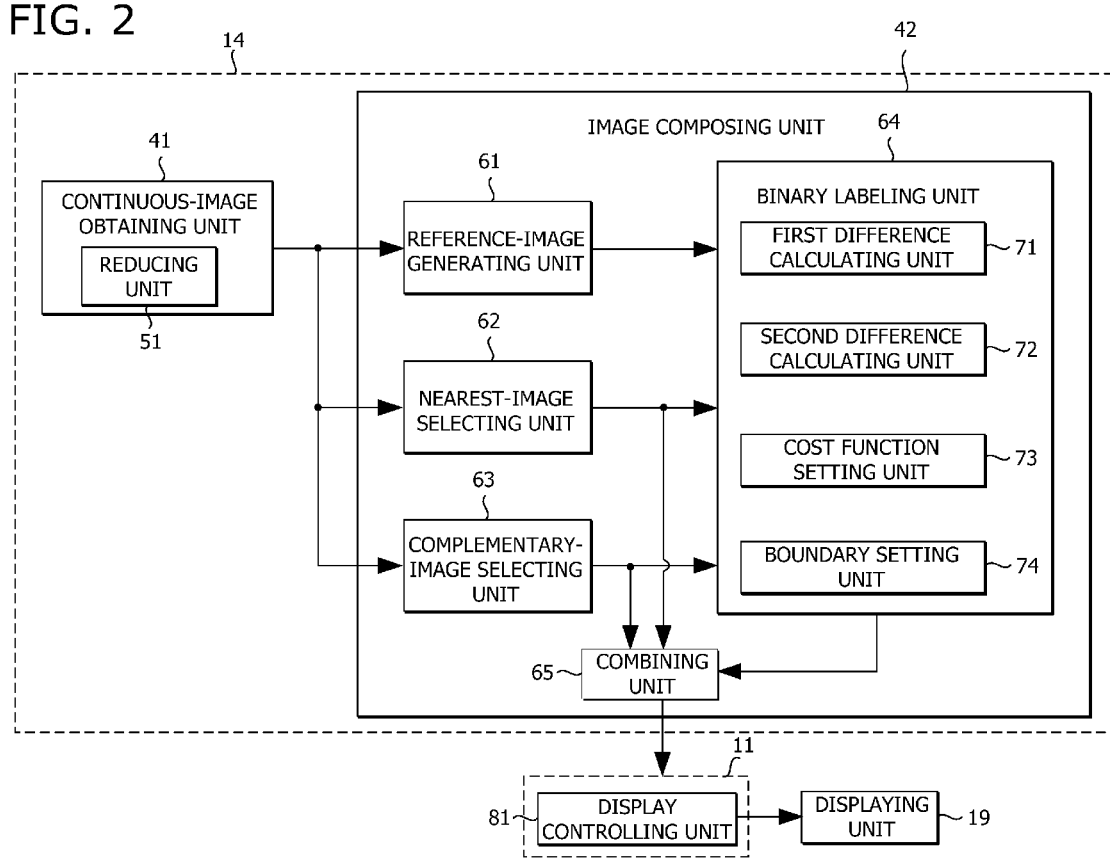

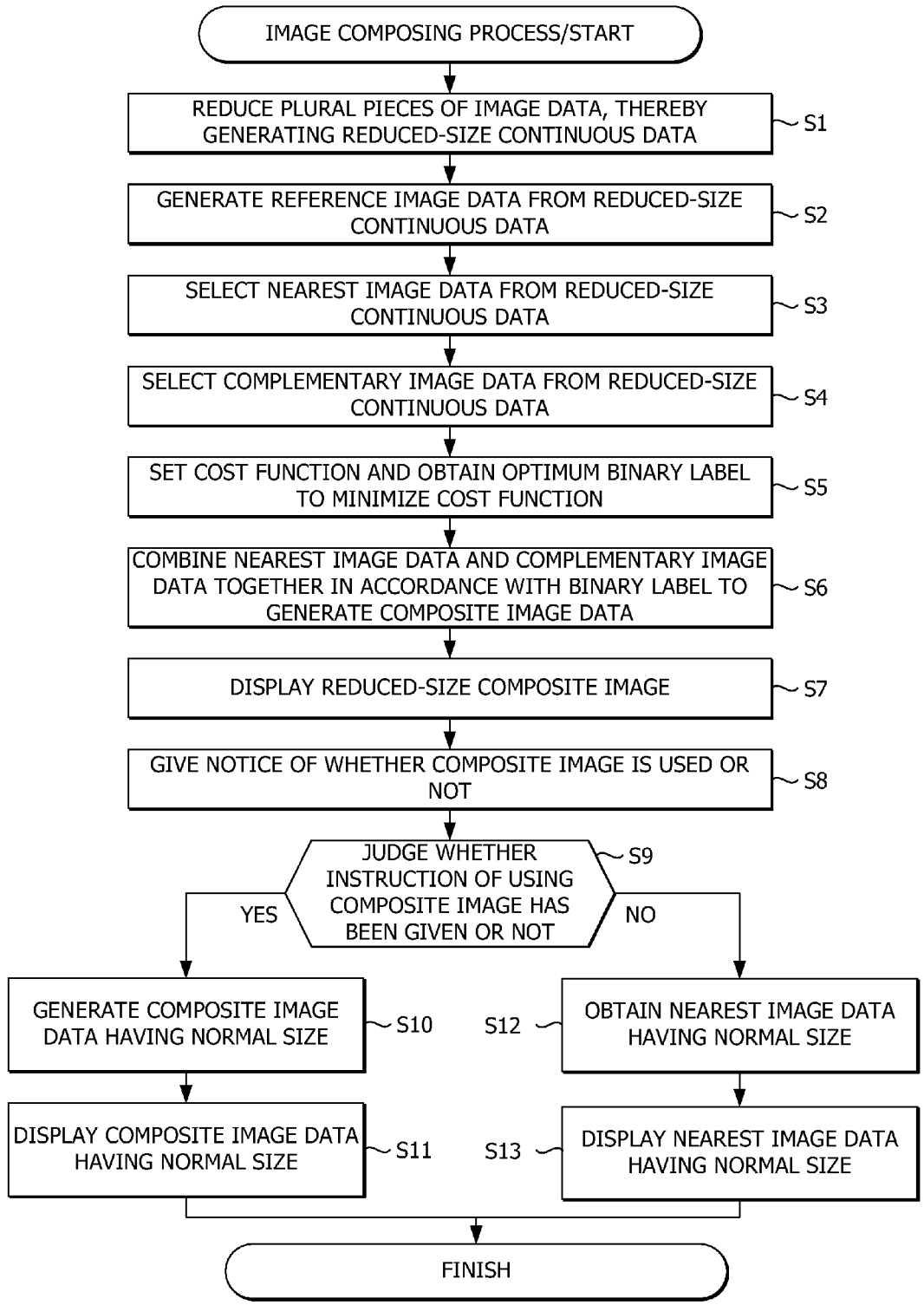

IMAGE PROCESSING APPARATUS, METHOD AND RECORDING MEDIUM FOR GENERATING A COMPOSITE IMAGE

BACKGROUND OF THE INVENTION

1. Field of the Invention

The present invention relates to an image processing apparatus, an image processing method and recording medium, and more particularly to an image processing apparatus, an image processing method and recording medium, for generating a composite image.

2. Description of the Related Art

There has been a desire to remove obstacles such as passers and moving objects from an image containing these obstacles and to obtain the image with the obstacles deleted. A conventional technique, which meets the above desire is disclosed in Japanese Patent No. Hei11-225344 A. The technique uses plural frames of image data captured at substantially the same field angle to estimate an image with no moving objects contained therein depending on a decision by a majority and/or averaging pixels of the images on a pixel to pixel basis.

Further, "Interactive Digital Photomontage" A. Agarwala, et al. ACM SIGGRAPH, 2004 (Hereinafter, "Document 1") discloses an algorithm, which minimizes discontinuity of an object by solving an optimization problem of multi-labeling in MRF (Markov Random Field) giving a labeling to the frame number of image data, with respect to plural frames of image data captured at substantially the same field angle.

SUMMARY OF THE INVENTION

The present invention has an object to provide an apparatus, a method and a recording medium storing a program, which use plural images continuously obtained and less image processing load to generate a composite image with obstacles such as moving objects removed from said image.

According to one aspect of the invention, there is provided an image processing apparatus, which comprises an image obtaining unit for continuously obtaining plural pieces of image data, which have substantially the same field angle, a reference-image generating unit for generating reference image data to be used for an image composition based on the plural pieces of image data obtained by the image obtaining unit, an image selecting unit for selecting at least two pieces of arbitrary image data from among the plural pieces of image data obtained by the image obtaining unit, a first difference calculating unit for calculating differences between the plural pieces of arbitrary image data selected by the image selecting unit for two adjacent pixels, a second difference calculating unit for calculating differences in pixel values of the plural pieces of arbitrary image data from the reference image data generated by the reference-image generating unit, a function setting unit for setting a function having variables of the differences calculated by the first difference calculating unit and the differences calculated by the second difference calculating unit, a boundary setting unit for setting boundaries respectively in the plural pieces of arbitrary image data so as to minimize the function set by the function setting unit, and an image combining unit for combining together the plural pieces of arbitrary image data selected by the image selecting unit based on the boundaries set by the boundary setting unit.

According to another aspect of the invention, there is provided an image processing method, which comprises an image obtaining step of continuously obtaining plural pieces of image data, which have substantially the same field angle, a reference-image generating step of generating reference image data to be used for an image composition based on the plural pieces of image data obtained at the image obtaining step, an image selecting step of selecting at least two pieces of arbitrary image data from among the plural pieces of image data obtained at the image obtaining step, a first difference calculating unit for calculating differences between the plural pieces of arbitrary image data selected at the image selecting step for two adjacent pixels, a second difference calculating unit for calculating differences in pixel values of the plural pieces of arbitrary image data from the reference image data generated at the reference-image generating step, a function setting step of setting a function having variables of the differences calculated at the first difference calculating step and the differences calculated at the second difference calculating step, a boundary setting step of setting boundaries respectively in the plural pieces of arbitrary image data so as to minimize the function set at the function setting step, and an image combining step of combining together the plural pieces of arbitrary image data selected at the image selecting step based on the boundaries set at the boundary setting step.

According to still another aspect of the invention, there is provided a computer readable recording medium to be mounted on an image processing apparatus, wherein the image processing apparatus is provided with a computer for controlling the whole operation of the image processing apparatus, the recording medium storing a program, when executed by the computer, to make the computer perform means, which comprises image obtaining means for continuously obtaining plural pieces of image data, which have substantially the same field angle, reference-image generating means for generating reference image data to be used for an image composition based on the plural pieces of image data obtained by the image obtaining means, image selecting means for selecting at least two pieces of arbitrary image data from among the plural pieces of image data obtained by the image obtaining means, first difference calculating means for calculating differences between the plural pieces of arbitrary image data selected by the image selecting means for two adjacent pixels, second difference calculating means for calculating differences in pixel values of the plural pieces of arbitrary image data from the reference image data generated by the reference-image generating means, function setting means for setting a function having variables of the differences calculated by the first difference calculating means and the differences calculated by the second difference calculating means, boundary setting means for setting boundaries respectively in the plural pieces of arbitrary image data so as to minimize the function set by the function setting means, and image combining means for combining together the plural pieces of arbitrary image data based on the boundaries set by the boundary setting means.

BRIEF DESCRIPTION OF THE DRAWINGS

FIG. 2 is a block diagram of a functional configuration of an image processing unit provided in the image pickup apparatus shown in FIG. 1.

FIG. 4 is a flow chart of an image composing process, which is mainly performed by the image processing unit shown in FIG. 2.

DETAILED DESCRIPTION OF THE PREFERRED EMBODIMENTS

Now, the preferred embodiments of the present invention will be described in detail with reference to the accompanying drawings.

Figure 1:
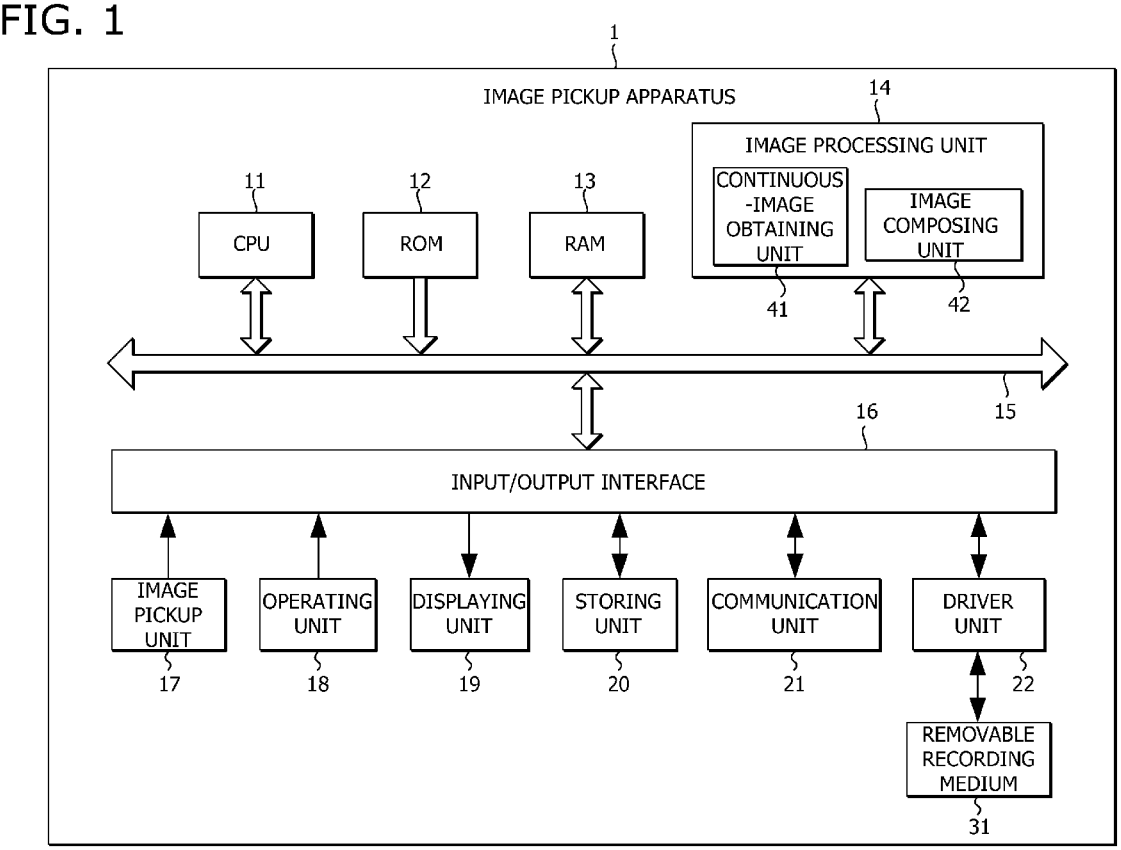
FIG. 1 is a block diagram of a configuration of hardware of an image pickup apparatus according to an embodiment of the invention.

FIG. 1 is a block diagram of a configuration of hardware of an image pickup apparatus 1 according to an embodiment of the invention. The image pickup apparatus 1 according to the present embodiment comprises, for instance, a digital camera.

The image pickup apparatus 1 comprises CPU (Central Processing Unit) 11, ROM (Read Only Memory) 12, RAM (Random Access Memory) 13, an image processing unit 14, a bus 15, an input/output interface 16, an image pickup unit 17, an operating unit 18, a displaying unit 19, a storing unit 20, a communication unit 21, and a driver unit 22.

CPU 11 runs a program stored in ROM 12 or a program loaded onto RAM 13 from the storing unit 20 to execute various sorts of processes. Data required for CPU 11 to execute various sorts of processes is stored in RAM 13, as necessary.

The image processing unit 14 comprises DSP (Digital Signal Processor) and VRAM (Video Random Access Memory), and works together with CPU 11 to perform various sorts of processes on image data. For instance, the image processing unit 14 performs an image processing on image data picked up by and transferred from an image pickup unit 17 to be described later, wherein the image processing includes processes of noise reduction, white balance, and hand-shake correction.

In the present embodiment, still images are subjected to the image processing by the image pickup apparatus 1 one sheet by one sheet, and one unit of the still images subjected to the image processing by the image pickup apparatus 1 is referred to as a "frame" in the following description. Unless otherwise described hereinafter, an image will denote a frame.

Further, as a general rule in the present embodiment, it is assumed that a size of the image (image-size or a resolution) is a size of an image to be stored in a removable recording medium to be described later, which image-size is to be subjected to the image processing by the image pickup apparatus 1 including the image processing unit 14. Hereinafter, such size is referred to as a "normal size".

In the present embodiment, the image processing unit 14 further comprises a continuous-image obtaining unit 41 and an image composing unit 42. Though more detail will be described later with reference to a view of FIG. 2, the image data is reduced in size from its normal size to a more reduced size, for instance, to a size of QVGA (Quarter-Video Graphics Array) by a reducing unit 51 in the continuous-image obtaining unit 41. In the present embodiment, the image data having such reduced size is processed by the image composing unit 42.

CPU 11, ROM, 12, RAM 13, and the image processing unit 14 are connected to each other through the bus 15. The input/output interface 16 is also connected to the bus 15. To the input/output interface 16 are connected the image pickup unit 17, the operating unit 18, the displaying unit 19, the storing unit 20, the communication unit 21, and the driver unit 22.

The image pickup unit 17 is provided with an optical lens unit (not shown) and an image sensor (not shown).

The optical lens unit consists of collecting lenses such as a focus lens and a zoom lens. The focus lens serves to form an image of a subject on a light-receiving plate of the image sensor. The zoom lens serves to vary a focal length within a certain range.

The optical lens unit is provided with a peripheral circuit, which adjusts setting parameters with respect to a focal point, exposure, and white balance, when needed.

The image sensor consists of a photoelectric conversion element and AFE (Analog Front End). The photoelectric conversion element consists of, for instance, CMOS (Complementary Metal Oxide Semiconductor). The photoelectric conversion element receives an incident subject image from the optical lens unit. The photoelectric conversion element executes photoelectric conversion on the subject image, thereby accumulating image signals for a certain period of time and successively supplies the accumulated image signals as an analog signal to AFE.

AFE performs various sorts of processes (including Analog/Digital conversion) on the analog image signal. The analog image signal is subjected to the various sorts of processes and converted into a digital signal. The resultant digital signal is output from the image pickup unit 17.

Hereinafter, the output signal from the image pickup unit 17 is referred to as "data of a picked-up image" or "picked-up image data". Therefore, the picked-up image data is output in units of frames from the image pickup unit 17 and supplied to CPU 11 and/or the image processing unit 14, as necessary. Hereinafter, unless otherwise defined, a picked-up image denotes a frame.

The operating unit 18 comprises various sorts of buttons for receiving an instruction of a user.

The displaying unit 19 has a liquid crystal device for displaying an image.

The storing unit 20 has DRAM (Dynamic Random Access Memory) and temporarily stores image data output from the image processing unit 14. The storing unit 20 stores data required by the image processing unit 14 for data processing.

The communication unit 21 controls communication with external devices (not shown) through a network including the Internet.

A removable recording medium 31 is installed into the driver unit 22, as necessary. The removable recording medium 31 is composed of a magnetic disk, an optical disk, a magnet-optical disk, and/or a semi-conductor disk. A program read from the removable recording medium 31 by the driver unit 22 is installed onto the storing unit 20, as required. The removable recording medium 31 is able to store various sorts of data such as image data stored in the storing unit 20 in a similar manner to the storing unit 20.

FIG. 2 is a block diagram of a functional configuration of the image processing unit 14 in the image pickup apparatus 1.

As shown in FIG. 2, the image processing unit 14 comprises the continuous-image obtaining unit 41 and the image composing unit 42.

The continuous-image obtaining unit 41 obtains plural pieces of image data, which are obtained by means of a continuous capturing. The continuous capturing means an operation executed by the image pickup apparatus 1 and the like to continuously capture an object plural times at substantially the same field angle.

The image data which the continuous-image obtaining unit 41 receives is not always from the image pickup unit 17 of the image pickup apparatus 1 but may be data sent from other image pickup device. In the present description, it is assumed for the sake of simplicity of explanation that the continuous-image obtaining unit 41 obtains plural pieces of image data, which are obtained in the continuous capturing operation performed by the image pickup unit 17 of the image pickup apparatus 1.

It is simply required that the continuous capturing operation is performed simply before the continuous-image obtaining unit 41 obtains the plural pieces of image data. But there is no need to perform such continuous capturing operation immediately before the continuous-image obtaining unit 41 obtains such plural pieces of image data.

In the present embodiment, it is also assumed that the plural pieces of image data obtained by the continuous capturing operation have the normal size.

As shown in FIG. 2, the continuous-image obtaining unit 41 has the reducing unit 51. The reducing unit 51 reduces the size (resolution) of the image data obtained by the continuous-image obtaining unit 41 from the normal size to a reduced size, for instance, to a size of QVGA.

Hereinafter, the plural pieces of image data having a size reduced by the reducing unit 51 is referred to as "reduced-size continuous data", and further each of plural pieces of reduced-size continuous data is represented by P[i], where "i" is the unique number (hereinafter, the "frame number") assigned to each of plural pieces of image data obtained by the continuous-image obtaining unit 41. In the case that "n" pieces of image data are obtained by the continuous-image obtaining unit 41, where "n" is an integer that is not less than 1, "i" denotes one of the frame number, 1 to "n", and reduced-size continuous data P[i] denotes data of a reduced-size image having the frame number "i".

The reducing unit 51 is not an essential element of the continuous-image obtaining unit 41. But to realize one of the objects of the present invention, that is, to realize an object of lightening loads of image processing for using images continuously obtained to generate a more natural composite image with an obstacle or a moving-object image removed, it is necessary to lighten as much as possible loads of an calculating operation by the image composing unit 42.

In the present embodiment, plural pieces of image data (data having the normal size) obtained by the continuous-image obtaining unit 41 are not used as-is by the image composing unit 42, but reduced-size continuous data P[1] to P[n], which are reduced in data volume are used to lighten the loads of calculation by the image composing unit 42. For the purpose of lightening the calculation load, the reducing unit 51 is provided in the continuous-image obtaining unit 41. Another reason for the provision of the reducing unit 51 in the continuous-image obtaining unit 41 is in that, in the case where the reduced-size continuous data is used in the image composing unit 42, even if a position misalignment should appear in the plural pieces of image data, which are obtained by the continuous-image obtaining unit 41 without using a tripod, such position misalignment will not cause so serious problem. It is possible to align images by geometric transform any number of times as required, and to do so would achieve much better result.

The image composing unit 42 chooses and obtains plural pieces of image data to be combined from among the reduced-size continuous data P[1] to P[n]. The image composing unit 42 sets a boundary line to separate or divide the plural pieces of image data to be combined. The image composing unit 42 connects or combines some of the separated image data along the boundary line, thereby generating composite image data.

By setting an appropriate boundary line, the image composing unit 42 can generate the composite image data with an obstacle or a moving-object image removed, which obstacle or moving-object image is included at least in some of the plural pieces of image data obtained in the continuous capturing operation.

To perform the series of processes described above, thereby generating the composite image data, the image composing unit 42 is provided with a reference-image generating unit 61, a nearest-image selecting unit 62, a complementary-image selecting unit 63, a binary labeling unit 64, and a combining unit 65.

Figure 3A:
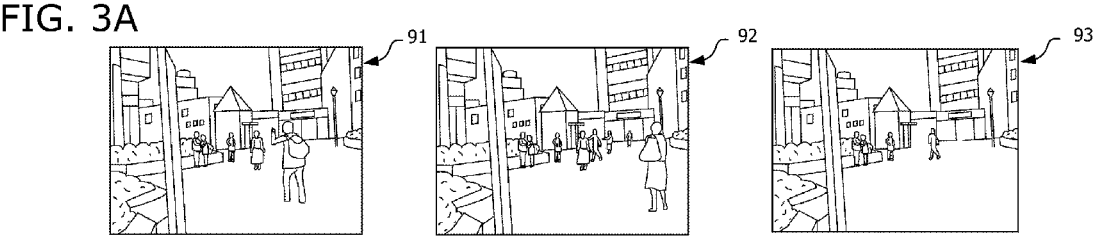
FIG. 3A is a view showing examples of resultant images out of a process performed by a reference-image generating unit, a reference nearest-image selecting unit, and a complementary image selecting unit in the image processing unit shown in FIG. 2.
Figure 3B:
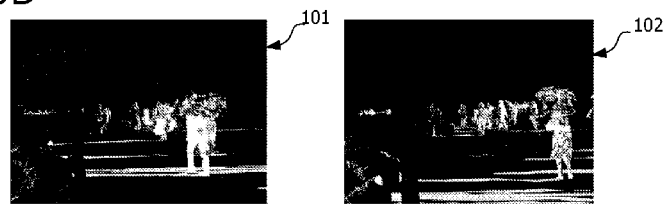
FIG. 3B is a view showing examples of resultant images out of a process performed by a second difference calculating unit in the image processing unit shown in FIG. 2.
Figure 3C:
FIG. 3C is a view showing examples of resultant images out of the processes performed by a boundary setting unit and a combining unit in the image processing unit shown in FIG. 2.

FIG. 3A to FIG. 3C are views showing examples of images obtained in the processes performed by the image composing unit 42 having the above-described configuration.

FIG. 3A are views showing examples of images obtained in the process performed by the reference-image generating unit 61, the nearest-image selecting unit 62, and the complementary-image selecting unit 63.

FIG. 3B and FIG. 3C are views showing examples of images (including intermediate results) obtained in the process performed by the binary labeling unit 64 and the combining unit 65.

Hereinafter, the functional configuration of the image composing unit 42 will be described with reference to the views of FIG. 3A to FIG. 3C

The reference-image generating unit 61 generates reference image data B from the reduced-size continuous data P[1] to P[n]. The reference image data B is used as a reference for combining images.

Any method, which can remove something moving from an image can be used as a method of generating the reference image data B. For instance, a general method of finding the median or calculating an average of the reduced-size continuous data P[1] to P[n] with respect to pixels and/or color components contained therein can be employed. Another method can be also employed, of finding a frame such that the sum of distances (absolute difference or difference square) between pixels of said frame and their corresponding pixels of other frame will be minimized and the reference image data B is generated using pixel values of such frame.

The reference image data B does not meet requirements of the finally output image, since an obstacle or a moving-object image may not be completely removed from the reference image data B. Therefore, in the present embodiment, the reference image data B is used as the reference to estimate the final output (i.e., the reference image data B represents a target image composition). It is assumed that image data 93 shown in FIG. 3A has been generated as the reference image data B.

In the present embodiment, the nearest-image selecting unit 62 selects and obtains, as one of image data to be combined, image data whose pixel values are most close to the reference image data B from among the reduced-size continuous data P[1] to P[n]. Hereinafter, such image data, which has been selected by the nearest-image selecting unit 62 in the above manner is referred to as the "nearest image data".

It will be enough that a composite image, which is nearest the reference image obtained by combining a nearest image as a result of combining the reference nearest-image and the other image. So the reference nearest-image is not always required to be nearest the reference image B. Hereinafter, it is assumed that reduced-size continuous data P[p] having a frame number "p" has been selected as the reference nearest-image data from among the reduced-size continuous data P[1] to P[n], where the frame number "p" is given by the following formula (1).

$$p = \underset{i}{\operatorname{argmin}} \sum_{u} d(B(u), P[i](u)) \quad (1)$$

In the formula (1), d(α, β) in the mathematical notation Σ denotes a function of outputting differences between pixel values α and pixel values β, where as the pixel values α are used pixel values of pixels "u" in the reference image B and as the pixel values β are used pixel values of substantially the same pixels as the pixels "u" (in the reference image B), among pixel values composing the reduced-size continuous data P[i]. As the differences can be employed an absolute luminance-differences, a sum of absolute color-component differences and/or a sum of difference-squares.

Using the formula (1), the sum of differences of all the pixels are calculated with respect to each of the frames, and the minimum sum of differences of a frame is found. Then, the frame number "i" of such frame will be the frame number "p" of the nearest image data P[p]. In the present embodiment, it is assumed that image data 91 shown in FIG. 3A has been obtained as the nearest image data P[p].

In the present embodiment, the complementary-image selecting unit 63 selects and obtains such complementary image data from among the reduced-size continuous data P[1] to P[n], that when said complementary image data is properly cropped and combined with the nearest image data P[p] to generate image data, the generated image data will be nearest the reference image data B. The image data, which has been selected, as one of the images to be combined, by the nearest-image selecting unit 62 in the above manner is hereinafter referred to as the "complementary image data". Hereinafter, it is assumed that a reduced-size continuous data P[q] having a frame number "q" has been selected from among the reduced-size continuous data P[1] to P[n] as complementary image data. The frame number "q" is given by the following formula (2).

$$q = \underset{i}{\operatorname{argmin}} \sum_{u} \min(d(B(u), P[i](u)), d(B(u), P[p](u))) \quad (2)$$

In the formula (2), d(A, B) in the mathematical notation Σ denotes a function of outputting the minimum value among parameters A and parameters B. Using the formula (2), differences between the reference image data B and the reduced-size continuous data P[i] and differences between the reference image data B and the nearest image data P[p] are compared on a pixel to pixel basis. A number "i" of such a frame that the sum of the less difference among the compared differences will be minimized is obtained as the frame number "q" of the complementary image data P[q]. In the present embodiment, it is assume that image data 92 shown in FIG. 3A has been obtained as the complementary image data P[q].

The binary labeling unit 64 gives the binary label "p" or "q" to each pixel of the nearest image data P[p] and the complementary image data P[q] to crop and paste said data. Hereinafter, the process performed by the binary labeling unit 64 is referred to as the "binary labeling".

A method of performing the binary labeling is not limited to a special one, but various methods can be employed to perform the binary labeling. In the present embodiment, it is assumed that a method using Graph Cut algorithm is employed.

From the reference nearest-image data P[p] and the complementary image data P[q], the binary labeling unit 64 calculates two terms of a cost function, such as a smoothing term and a data term.

The binary labeling unit 64 uses the Graph Cut algorithm to find out the binary labeling to give all the pixels the label "p" or "q", thereby minimizing the cost function. The Graph Cut algorithm will be described later.

The cost function and the Graph Cut algorithm are described in the Document 1 in detail.

Performing the binary labeling, the binary labeling unit 64 can set a boundary line to appropriately crop and paste the nearest image data P[p] and the complementary image data P[q].

In order to perform the series of processes to set the optimum boundary line, the binary labeling unit 64 is provided with a first difference calculating unit 71, a second difference calculating unit 72, a cost function setting unit 73, and a boundary setting unit 74.

FIG. 3B is a view showing resultant images obtained in a process performed by the second difference calculating unit 72.

In the case shown in FIG. 3A, the reference nearest-image data P[p] is shown by the image data 91, the complementary image data P[q] is shown by the image data 92, and the reference image data B is shown by image data 93.

Gray scale image data 101 shown in FIG. 3B is a data term Cp, which is obtained from the image data 91 to 93 shown in FIG. 3A, and gray scale image data 102 shown in FIG. 3B is a data term Cq, which is obtained from the image data 91 to 93 shown in FIG. 3A.

The first difference calculating unit 71 uses the following formula (3) to calculate a function C(u, v) for pairs of adjacent pixels (u, v). Detail of the formula (3) will be described later. Hereinafter, the function C(u, v) is referred to as a "smoothness term".

$$C(u,v)=d(P[p](u),P[q](u))+d(P[p](v),P[q](v)) \quad (3)$$

According to the formula (3), a method is employed, in which the function C(u, v) or the smoothness term is given by the sum of differences between the reference nearest image data P[p] and the complementary image data P[q] at one (for instance, "u") of the adjacent pixels (u, v) and differences between the reference nearest image data P[p] and the complementary image data P[q] at the other one (for instance, "v") of the adjacent pixels (u, v). This method is a general algorithm disclosed in Document 1.

Since the less the smoothness term is decreased, the nearer a region defined by the reference nearest image data P[p] and a region defined by the complementary image data P[q] become, it is possible to make a boundary line not noticeable, if the boundary line could be drawn in such regions. When the region is divided into two portions by the boundary line, the data term to be calculated by the second difference calculating unit 72 is necessary to determine which one of the divided portions should be deleted, or which one of the divided portions is a part of a moving object.

In the present embodiment, the second difference calculating unit 72 calculates a function Cp(u) and a function Cq(u) for pixels "u" in accordance with the following formulas (4) and (5). The meaning of these function Cp(u) and function Cq(u) will be described later. Hereinafter, these functions Cp(u) and Cq(u) are collectively referred to as the "data term".

$$Cp(u)=d(B(u),P[p](u)) \quad (4)$$

$$Cq(u)=d(B(u),P[q](u)) \quad (5)$$

According to the formulas (4) and (5), a method is employed in the present embodiment, in which method the difference of the reference nearest-image data P[p] from the reference image data B at pixel positions "u", and the difference of the complementary image data P[q] from the reference image data B at pixel positions "u" are obtained as the data terms. The current method is unique for the present embodiment, and is not employed in any other conventional apparatuses.

Since it seems that a trace of an obstacle or a moving object remains less in the reference image data B, the region in question is more likely to be a region of a background image, as the data term decreases less. Therefore, if it is possible to draw a boundary line in a region where the smoothness term is low, thereby cropping the region where the data term is low, composite image data like the reference image data B can be obtained with no boundary line passing over the moving object.

The cost function setting unit 73 uses the smoothness term C calculated by the first difference calculating unit 71 and the data terms Cp, Cq calculated by the second difference calculating unit 72 to set a cost function. This cost function is used to find the optimum boundary line to separate all the pixels into those falling into the region to be cropped out of the nearest image data P[p] and those falling into the region to be cropped out of the complementary image data P[q].

The cost function setting unit 73 assumes a graph consisting of a class of the following nodes and a class of edges stretched between the nodes. In other words, the nodes are set respectively at all the pixels in composite image data generated by cropping and pasting the nearest image data P[p] and the complementary image data P[q], and the edges are stretched between all the pairs of adjacent pixels (u, v).

Further, the cost function setting unit 73 assumes spaces (a p-side space and a q-side space) at both sides of the graph and adds one imaginary node in each space. The imaginary node added in the p-side space is referred to as a "source node" and the imaginary node added in the q-side space is referred to as a "sink node".

Then, the cost function setting unit 73 stretches edges from the source node to all the pixels and edges from all the pixels to the sink node.

The cost function setting unit 73 gives the edges stretched between the pairs of adjacent pixels (u, v) weights of the smoothness term C(u, v) calculated by the first difference calculating unit 71.

The cost function setting unit 73 gives the edges stretched from the source node to all the pixels weights of the data term Cq(u) calculated by the second difference calculating unit 72. The cost function setting unit 73 gives the edges stretched from all the pixels to the sink node weights of the data term Cp(u) calculated by the second difference calculating unit 72. The graph, to which weights are given, is referred to as a "weighted graph".

The cost function setting unit 73 prepares the weighted graph to calculate the cost function, and supplies the weighted graph to the boundary setting unit 74.

For better understanding of an operation of the boundary setting unit 74, the Graph Cut and the cost function will be described.

In a graph G, when all the edges belonging to a partial class E are separated from an edge class of G, and a node class of G is divided into two partial classes, the partial class E of edges is hereinafter referred to as "Cut E of graph G". The sum of the weights given to all the edges belonging to the Cut E is hereinafter referred to as a "cost function of Cut E".

The boundary setting unit 74 examines all the Cuts E for separating the weighted graph supplied from the cost function setting unit 73 into a p-side node class and a q-side node class.

When the weighted graph is separated into a p-side node class and a q-side node class by the Cuts E, edges connecting all the pairs of pixels in the p-side space and pixels in the q-side space, which are adjacent at a boundary line between the pixels in the p-side space and the pixels in the q-side space are separated and therefore, belong to Cut E.

Therefore, the weight (smoothness term) C(u, v) for edges connecting all the adjacent pairs of pixels "u" in the p-side space and pixels "v" in the q-side space is added to the cost function of Cut E.

The less the weight C(u, v) becomes, the less the difference between the nearest image data P[p] and the complementary image data P[q] becomes in the vicinity of the pairs of pixels (u, v), and the boundary line becomes hardly distinguishable.

The source node belonging to the p-side space and edges connecting all the pixels held in the q-side space are subsequently separated, and therefore, belong to Cut E.

Therefore, the weight (data term) Cq(u) for edges connecting all the pixels "u" in the q-side space to the source node is added to the cost function of Cut E.

The less the weight Cq(u) becomes, the less the difference between the complementary image data P[q] and the reference image data B for pixels "u" becomes, and therefore, it will turn out successful that the pixel values of the complementary image data P[q] for the pixels "u" have been employed.

On the contrary, the edges connecting the sink node in the q-side space with all the pixels held in the p-side space are subsequently separated and therefore, belong to Cut E.

The weight (data term) Cp(u) for the edges connecting the sink node with all the pixels "u" in the p-side space is added to the cost function of Cut E.

The less the weight Cp(u) becomes, the less the difference between the nearest image data P[p] and the reference image data B for the pixels "u" becomes, and therefore, it will turn out successful that the pixel values of the reference nearest-image data P[p] for pixels "u" have been employed.

When the Cut E whose cost function becomes minimum is found from among all the available cuts of the weighted graph, such Cut E will be substantially the optimized binary labeling for setting a boundary line between the pixels in the p-side space and the pixels in the q-side space, thereby cropping and pasting the reference nearest-image data P[p] and the complementary image data P[q].

The series of processes described above are performed by the so-called Graph Cut method. Some of specific algorithms of Graph Cut method are known.

Graph Cut method disclosed in the Document 1 uses multi-labeling and requires to repeatedly perform the above calculation several times. As a result, much calculation load is needed. On the contrary, in Graph Cut method performed in the present embodiment of the invention, two frames of reduced-size continuous data are simply cropped and pasted and a binary labeling is used. As a result, the calculation load can be reduced.

The boundary setting unit 74 sends the combining unit 65 the binary label given by the binary labeling unit 64.

The combining unit 65 uses the binary label determined by the boundary setting unit 74 to employ pixel values corresponding to the reference nearest-image data P[p] for the pixels in the p-side space and pixel values corresponding to the complementary image data P[q] for the pixels in the q-side space, thereby generating composite image data. The combining unit 65 supplies the composite image data to a display controlling unit 81.

FIG. 3C is a view showing examples of resultant images generated in the processes performed by the boundary setting unit 74 and the combining unit 65.

In the example shown in FIG. 3A, the reference nearest-image data P[p] is shown by the image data 91, the complementary image data P[q] is shown by the image data 92, and the reference image data B is shown by the image data 93.

The binary label generated by the boundary setting unit 74 is shown in FIG. 3C. As shown in FIG. 3C, an image 111 has a region expressed in white and a region expressed in black, and the white region contains pixel values of the reference nearest-image data P[p] to be employed and the black region contains pixel values of the reference nearest-image data P[p] to be deleted. Meanwhile, an image 112 also has a region expressed in white and a region expressed in black, wherein the white region contains pixel values of the complementary image data P[q] to be employed and the black region contains pixel values of the complementary image data P[q] to be deleted. As described, the images 111 and 112 have a complementary relationship with respect to the white region and the black region.

The complementary image data P[q] and the complementary image data P[q] are cropped and pasted using the boundary line (a broken line in an image 113) between the white region and the black region of the images 111 and 112, whereby composite image data 113 is obtained, as shown in FIG. 3C.

Now, an image composing process will be described with reference to a flowchart of FIG. 4. FIG. 4 is a flowchart of the image composing process, which is mainly performed by the image processing unit 14 shown in FIG. 2.

The image composing process starts at the time when a user operates the button in the operating unit 18 or select a menu to give an instruction of starting the image composing process, and processes at step S1 to step S13 in FIG. 4 are performed.

The reducing unit 51 of the continuous-image obtaining unit 41 reduces plural pieces of image data ("n" sheets of images) obtained in the continuous shooting operation to generate reduced-size continuous data P[1] to P[n] (step S1).

The reference-image generating unit 61 generates reference image data B from the reduced-size continuous data P[1] to P[n] generated in the process at step S1 (step S2). For example, in the example shown in FIG. 3A, the image data 93 is generated as the reference image data B (step S2).

The nearest-image selecting unit 62 selects nearest image data P[p] from among the reduced-size continuous data P[1] to P[n] generated in the process at step S1 (step S3). For instance, in the example shown in FIG. 3A, the image data 91 is generated as the nearest image data P[p] (step S3).

The complementary-image selecting unit 63 selects complementary image data P[q] from among the reduced-size continuous data P[1] to P[n] generated in the process at step S1 (step S4). For instance, in the example shown in FIG. 3A, the image data 92 is generated as the complementary image data P[q] (step S4).

The binary labeling unit 64 sets a cost function from the reference image data B generated in the process at step S2, the nearest image data P[p] selected in the process at step S3, and the complementary image data P[q] selected at step S4, and minimizes the cost function to obtain the optimum binary label (step S5).

For instance, in the example shown in FIG. 3B, the image data 101 has been generated, which indicates the difference between the reference image data B and the nearest-image data P[p], and the image data 102 has been generated, which indicates the difference between the reference image data B and the complementary image data P[q]. The image data 101 and image data 102 are used as the data term of the cost function.

The combining unit 65 combines the nearest image data P[p] and the complementary image data P[q] together in accordance with the optimum binary label obtained in the process at step S5 to generate composite image data (step S6). This composite image is hereinafter referred to as a "reduced-size composite image" to be separately referred to from a composite image of a normal size.

For instance, in the example shown in FIG. 3C, the image data 111 has been generated in accordance with the optimum binary label obtained in the process at step S5, in which data 111 a region selected to be cropped out of the nearest image data P[p] is represented in white, and the image data 112 has been generated in accordance with the optimum binary label, in which data 112 a region selected to be cropped out of the complementary image data P[q] is represented in white. As a result, the image data 113, that is, data of the reduced-size composite image has been generated in the process at step S6.

The reduced-size composite image data is sent from the combining unit 65 to the display controlling unit 81, and the process advances to step S7.

The display controlling unit 81 displays on the displaying unit 19 an image represented by the data sent from the combining unit 65, that is, displays the reduced-size composite image.

The displaying state of the reduced-size composite image is not limited to any special state. For instance, the display controlling unit 81 can display the reduced-size composite image as-is on the displaying unit 19. In other words, the reduced-size composite image is displayed at a smaller size than the displaying screen of the displaying unit 19. The display controlling unit 81 can enlarge the size of the reduced-size composite image as wide as the displaying screen of the displaying unit 19 to display the same data on the displaying unit 19. In any way, compared with the plural images obtained by the continuous capturing operation, the reduced-size composite image data is displayed at a less resolution on the displaying unit 19.

A composite image that the user finally wants to obtain as one to record is an image having substantially the same image quality as the plural images obtained by the continuous capturing operation, that is, an image having the same size (normal size) as the plural images obtained by the continuous capturing operation. But the images of the normal size include many pixels and require much time to be processed in the image composing process. Therefore, while the user is unable to decide whether the images are to be employed or not, it is not appropriate to process all the images having the normal size with no exception. Since it is often possible to visually confirm in the reduced-size composite image whether or not a significant defect such as discontinuity is contained in a combined object, the reduced-size composite image is displayed on the displaying unit 19 for the purpose of a preview. Viewing the reduced-size composite image displayed on the displaying unit 19, the user can operate the operating unit 18 to give an instruction of deciding whether or not the composite image corresponding to the displayed reduced-size composite image is to be employed.

The display controlling unit 81 displays on the displaying unit 19 an image giving notice of whether the composite image is employed or not (step S8). The way of giving notice is not limited to the image displayed on the displaying unit 19, but an acoustic message of giving notice of employment or abandon of the composite image may be made through a speaker (not shown).

The image composing unit 42 judges whether or not an instruction of employing the composite image has been given (step S9). When the user operates the operating unit 18 to give an instruction of employment and recording of the composite image of the normal size corresponding to the reduced-size composite image displayed on the displaying unit 19, it is determined YES at step S9, and the process advances to step S10.

Then, the image composing unit 42 generates composite image data having the normal size (step S10). In other words, the nearest-image selecting unit 62 obtains the nearest image data of the normal size. The nearest image data of the normal size is one of the plural pieces of image data obtained by the continuous capturing operation, which one has not yet been reduced in size by the reducing unit 51.

The complementary-image selecting unit 63 obtains complementary image data of the normal size. The complementary image data of the normal size is one of the plural pieces of image data obtained by the continuous capturing operation, which one has not yet been reduced in size by the reducing unit 51.

The binary labeling unit 64 interpolates and enlarges the binary label used in the process at step S6 into a binary label of the normal size. For instance, in this case, the nearest neighbour algorithm can be used to simply interpolate the label values 0 and/or 1, or the linear interpolation algorithm can be used to simply interpolate the label values 0 and/or 1, thereby setting the center position of the label values to a real number "α" between [0, 1].

The combining unit 65 applies the binary label of the enlarged normal size to the nearest image data I[p] of the normal size and the complementary image data I[q] of the normal size to generate composite image data of the normal size. More specifically, assuming that the label value 0 or 1 at a pixel position "u" or a value "α" of the interpolated [0, 1] is expressed by A(u), and "0" means selection of the p-side space and "1" means selection of the q-side space, then output pixel value R(u) will be calculated by the following formula.

$$R(u)=I[p](u) \times (1-A(u))+I[q](u) \times A(u)$$

When the combining unit 65 sends the composite image data of the normal size to the display controlling unit 81, the process advances to step S11.

The display controlling unit 81 displays an image represented by the data sent from the combining unit 65, that is, displays the composite image of the normal size to the extent allowed by the whole display screen of the displaying unit 19 (step S11). Then, the image composing process finishes.

Meanwhile, when the reduced-size composite image displayed on the displaying unit 19 at step S7 is not a desired one for the user, an instruction of not employment of such composite image is given, and the judgment is made NO at step S9. Then, the process advances to step S12.

The nearest-image selecting unit 62 obtains nearest image data of the normal size (step S12). When the nearest-image selecting unit 62 sends the nearest image data having the normal size to the combining unit 65, the process advances to step S13.

The display controlling unit 81 displays an image represented by the data supplied from the nearest-image selecting unit 62 through the combining unit 65 (step S13), that is, the display controlling unit 81 displays the nearest image having the normal size as an image to be used for substitution. Since this image has been captured and obtained at the moment when fewest moving objects are contained therein, this image seems to be the nearest image that the user wants to obtain, and since this image is single, the image has no defect.

Then, the image composing process finishes.

As described above, the image pickup apparatus 1 according to the present embodiment selects two complementary images from among plural images, which have been obtained by the capturing operation performed continuously in time at substantially the same field angle, and sets the optimum boundary lines respectively in the selected images, using Graph Cut algorithm and the like, to crop and paste them with light calculation load, thereby obtaining a composite image with moving objects removed.

The method disclosed in Japanese Patent No. Hei11-225344 A has a drawback that a dull image of a moving object remains in a composite image due to an averaging technique. In the present embodiment of the invention, since two images are cropped and pasted to compose a composite image using no averaging technique, no trace of the dull image remains in the composite image. Using Graph Cut algorithm, it is possible to avoid setting of a boundary line crossing a moving object, and therefore, an edge of the moving object cannot remain in the resultant image. Although Graph Cut algorithm for the multi-labeling requires much calculation load, Graph Cut algorithm for the binary labeling as used in the present embodiment requires less calculation load.

Although specific embodiments of the invention have been described in the foregoing detailed description, it will be understood that the invention is not limited to the particular embodiments described herein, but numerous rearrangements, modifications, and substitutions may be made to the embodiments without departing from the scope of the invention.

For instance, in the image pickup apparatus 1 according to the present embodiment, the reference nearest-image data is selected at first, and then the complementary image data is selected to be combined with such reference nearest-image data selected previously. As described above, since all that is required is that the resultant image, into which two images are combined is nearest the reference image, another embodiment may be possible, in which all the combinations of two arbitrary frames selected from among the reduced-size continuous image data are examined to select the optimum combination (p, q) from among the reduced-size continuous image data. More specifically, in such embodiment, the following formula (6) is used in place of the formulas (1) and (2).

$$(p, q) = \underset{(i,j)}{\operatorname{argmin}} \sum_{u} \min(d(B(u), P[i](u)), d(B(u), P[j](u))) \quad (6)$$

But it requires much time to examine all the combinations of two arbitrary frames, and therefore, it is possible to use the combination of the first frame and the last frame, since a moving object saliently moves in these two images captured separately in time.

The images to be combined with each other are not always limited to two frames, but more than two frames may be combined. In this case, more than two labeling is applied and a time required for performing the image processing increases, but if the number of frames to be processed is enough smaller than "n", the process can be performed at a high rate.

As the difference between the plural pieces of data, an absolute difference, a difference square, an inverse correlation value, a sum of luminance or color components, converted values of these values by a function, clipped values of these values, and other variations can be used.

For example, in the above embodiments, the image data to be subjected to the image composing process are plural pieces of image data, which are obtained by the continuous capturing operation and reduced in size, but the plural pieces of image data, obtained by the continuous capturing operation and having the normal size, can be used for the image composing process, if a time required for the image composing process allows.

In the above description of the embodiments of the invention, the image processing apparatus, to which the present invention is applied is an image pickup apparatus such as a digital camera, but the present invention can be applied to any other electronic equipment other than the image pickup apparatus, as far as such equipment has the image processing function, and regardless of whether such equipment has the image capturing function or not (plural pieces of image data can be obtained from a separate apparatus). For instance, the present invention can be applied to a wide variety of apparatuses such as digital photo frames, personal computers, portable-type navigating apparatuses, and handheld game machines.

The series of processes described above can be realized by hardware as well as by software.

When the series of processes are performed by the software, a program composing the software is installed onto a computer from a network or recording media. The computer can be one mounted on specialized hardware. Further, the computer can be one that is able to execute various sorts of functions, when various sorts of programs are installed thereon, for instance, a general-purpose computer.

The recording media storing these sorts of programs are composed of not only removable recording media 31 in FIG. 1, which are distributed separately from the image processing apparatus among the users to provide the programs, but also recording media previously mounted on the image processing apparatuses to be supplied to the user. The removable recording media are composed of, for instance, magnetic disks (including floppy disk), optical disks, and/or magnet-optical disks. For instance, the optical disk is composed of CD-ROM (Compact Disk Read Only Memory) and DVD (Digital Versatile Disk). The magnet-optical disk is composed of MD (Mini Disk). The recording medium previously mounted on the image processing apparatus to be supplied to the user is composed of, for instance, ROM 12 storing the program and a hard disk drive included in the storing unit 20, both shown in FIG. 1.

It is to be noted that the procedures of recording the program in the recording medium in the present description include the processes executed in time-series in the order and also the processes executed in parallel or separately.

What is claimed is:

1. An image processing apparatus comprising a processor, wherein the processor functions as units comprising:
    an image obtaining unit which obtains plural pieces of image data, wherein the obtained plural pieces of image data have a substantially same field angle and include image data of a moving object;
    a reference-image generating unit which generates reference image data that represents a target image composition, wherein the generated reference image data is based on the obtained plural pieces of image data and includes less of a region containing the moving object than the obtained plural pieces of image data;
    an image selecting unit which selects at least two pieces of image data from among the obtained plural pieces of image data such that when the selected pieces of image data are combined into a composite image, the composite image will more closely resemble the generated reference image data than each of the obtained plural pieces of image data, wherein a number of the selected pieces of image data is less than a number of the obtained plural pieces of image data;
    a boundary setting unit which sets boundaries respectively in the selected pieces of image data; and
    an image combining unit which combines together the selected pieces of image data into the composite image based on the set boundaries.

2. The image processing apparatus according to claim 1, wherein the image selecting unit selects at least one piece of first image data, which has pixel values close to pixel values of the reference image data, from among the obtained plural pieces of image data, and further selects at least one piece of second image data different from the selected first image data from among the obtained plural pieces of image data, and wherein the image combining unit combines the selected first image data with the selected second image data into the composite image.

3. The image processing apparatus according to claim 1, further comprising:
    an image picking-up unit which continuously captures an object at a substantially same field angle to capture plural pieces of image data,
    wherein the image obtaining unit obtains the plural pieces of image data captured by the image picking-up unit.

4. The image processing apparatus according to claim 1, further comprising an image processing unit which processes the selected plural pieces of image data to reduce an information volume thereof.

5. The image processing apparatus according to claim 1, wherein the processor functions as:
    a first difference calculating unit which calculates a first difference between a first one of the selected pieces of image data and a second one of the selected pieces of image data for two adjacent pixels in each of the first and second selected pieces of image data;
    a second difference calculating unit which calculates a second difference in pixel values between each of the selected pieces of image data and the generated reference image data; and
    a function setting unit which sets a function having variables of the calculated first difference and the calculated second differences;
    wherein the boundary setting unit sets the boundaries respectively in the selected pieces of image data so as to minimize the function set by the function setting unit; and
    wherein the image combining unit combines together the selected pieces of image data based on the set boundaries.

6. The image processing apparatus according to claim 1, wherein the reference-image generating unit generates the reference image with median pixel values of the obtained plural pieces of image data.

7. The image processing apparatus according to claim 1, wherein the reference-image generating unit generates the reference image with average pixel values of the obtained plural pieces of image data.

8. The image processing apparatus according to claim 1, wherein the reference-image generating unit generates the reference image by finding a frame of image data such that a sum of distances between pixel values of the frame of image data and corresponding pixel values of other frames of image data will be minimized.

9. The image processing apparatus according to claim 1, wherein each of the obtained plural pieces of image data comprises image data of a region including a substantially same view of a same subject; and
   wherein the composite image data combined by the image combining unit comprises image data of a substantially same region as the region including the substantially same view of the same subject in each of the obtained plural pieces of image data.

10. An image processing method comprising:
   obtaining plural pieces of image data, wherein the obtained plural pieces of image data have a substantially same field angle and include image data of a moving object;
   generating reference image data which represents a target image composition, wherein the generated reference image data is based on the obtained plural pieces of image data and includes less of a region containing the moving object than the obtained plural pieces of image data;
   selecting at least two pieces of image data from among the obtained plural pieces of image data such that when the selected pieces of image data are combined into a composite image, the composite image will more closely resemble the generated reference image data than each of the obtained plural pieces of image data, wherein a number of the selected pieces of image data is less than a number of the obtained plural pieces of image data;
   setting boundaries respectively in the selected pieces of image data; and
   combining together the selected pieces of image data into the composite image based on the set boundaries.

11. A non-transitory computer readable recording medium mountable on an image processing apparatus, wherein the image processing apparatus comprises a computer for controlling operations thereof, the recording medium storing a program which, when executed by the computer, controls the computer perform functions comprising:
   obtaining plural pieces of image data, wherein the obtained plural pieces of image data have a substantially same field angle and include image data of a moving object;
   generating reference image data which represents a target image composition based on the obtained plural pieces of image data, wherein the generated reference image data is based on the obtained plural pieces of image data and includes less of a region containing the moving object than the obtained plural pieces of image data;
   selecting at least two pieces of image data from among the obtained plural pieces of image data such that when the selected pieces of image data are combined into a composite image, the composite image will more closely resemble the generated reference image data than each of the obtained plural pieces of image data, wherein a number of the selected pieces of image data is less than a number of the obtained plural pieces of image data;
   setting boundaries respectively in the selected pieces of image data; and
   combining together the selected pieces of image data into the composite image based on the set boundaries.

* * * * *